Feb. 7, 1939. L. K. DAVIS 2,146,467
STEERING MECHANISM
Filed Sept. 15, 1937 2 Sheets-Sheet 2
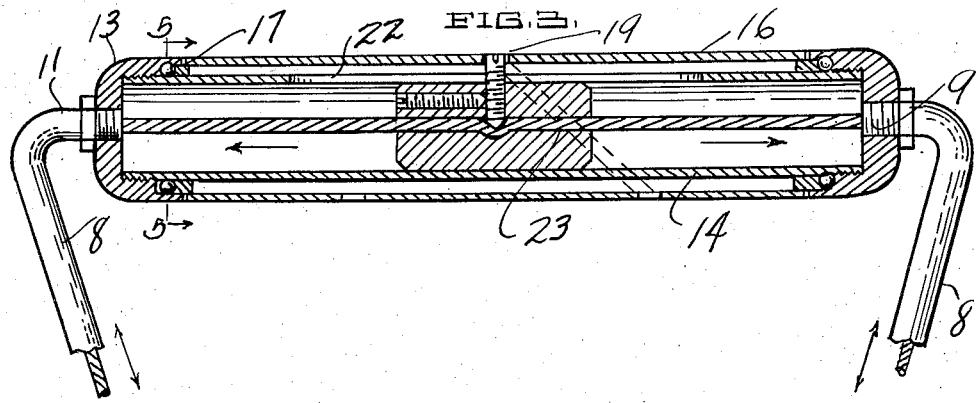
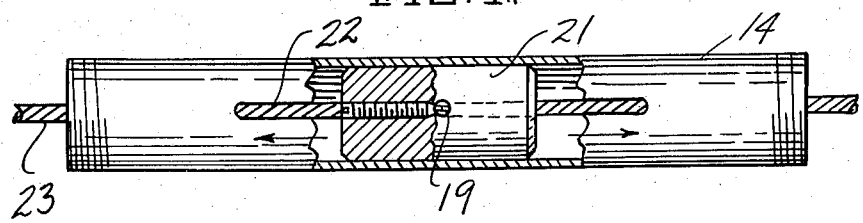
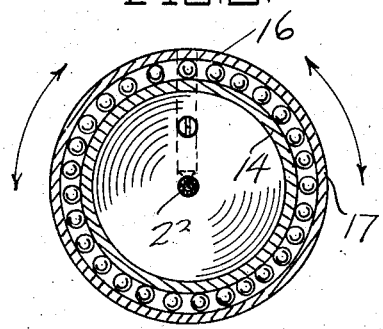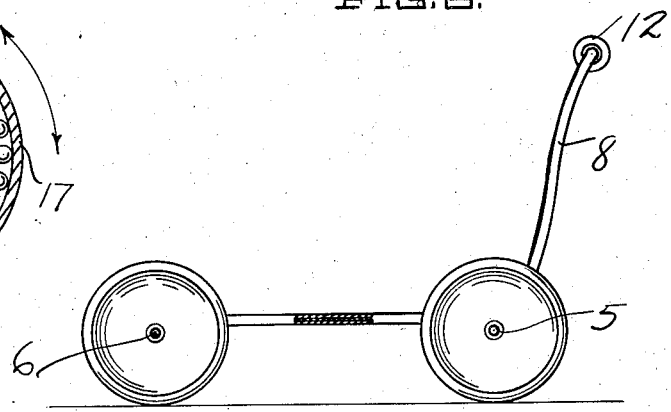
INVENTOR.
LOYD K. DAVIS.
BY *Victor J. Evans Co*
ATTORNEYS.

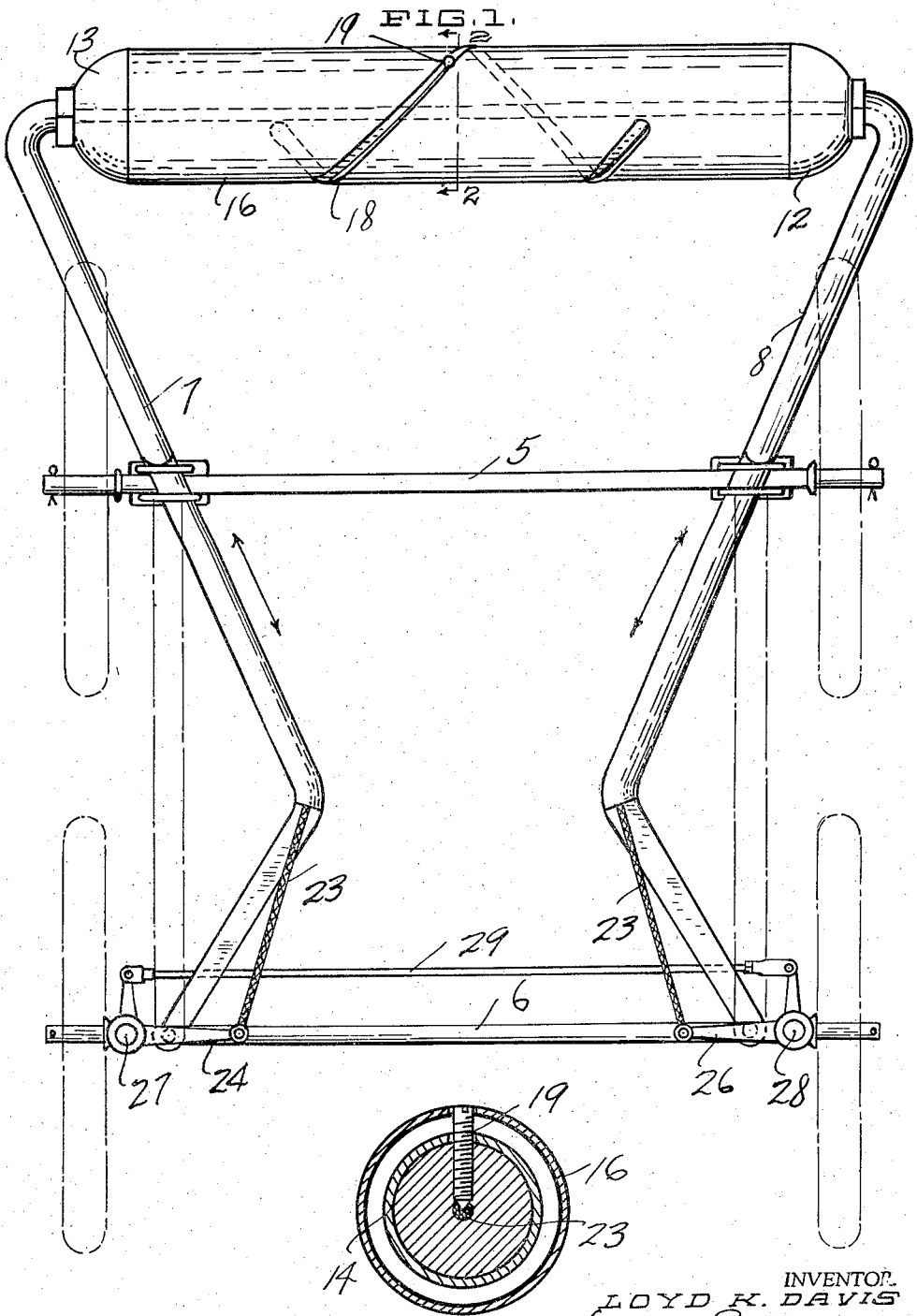

Patented Feb. 7, 1939

2,146,467

UNITED STATES PATENT OFFICE 2,146,467

STEERING MECHANISM

Loyd K. Davis, Grand Canyon, Ariz.

Application September 15, 1937, Serial No. 164,069

3 Claims. (Cl. 280—48)

This invention relates to improvements in steering mechanism for baby carriages and the like.

An object of the invention is to provide means in the handle of a baby carriage for guiding or changing the direction of the wheels of the baby carriage.

A further object is to produce a device of this character which may be utilized with any standard form of baby carriage.

A further object is to produce a device of this character which will be neat in appearance, easy to operate, and economical to manufacture.

Other objects and advantages will be apparent during the course of the following description.

In the accompanying drawings forming a part of this specification and in which like numerals are employed to designate like parts throughout the same, Fig. 1 is a top plan view of the baby carriage chassis, showing the wheels and springs in dotted lines;

Fig. 2 is a cross sectional view taken on the line 2—2 of Fig. 1;

Fig. 3 is a horizontal cross sectional view of the controlling handle;

Fig. 4 is a top plan view of the inner handle member;

Fig. 5 is a cross sectional view taken on the line 5—5 of Fig. 3; and

Fig. 6 is a side elevation of the baby carriage chassis, having my invention applied thereto.

Ordinarily, to steer a baby carriage around a corner, it is necessary to lift the front of the carriage, or, in other words, tip the carriage so that only two wheels are upon the ground.

I have, therefore, devised a very simple arrangement, whereby the handle of the baby carriage may be given a slight rotation, which in turn will cause the front wheels of the carriage to execute various maneuvers.

In the accompanying drawings wherein for the purpose of illustration is shown a preferred embodiment of my invention, the numerals 5 and 6 designate the customary rear and front axles respectively of the baby carriage having wheels, as shown in dotted lines in Fig. 1. Springs may also be interposed between the axles, if desired, and it is usually upon these springs that the body of the baby carriage is supported. I have shown tubular members 7 and 8, which are connected to the axles 5 and 6 and have their upper extremities bent toward each other, as shown at 9 and 11 respectively. End pieces 12 and 13 are connected to the ends 9 and 11 and serve to support an inner stationary member 14, upon which is rotatably mounted the outer handle 16 through the medium of roller bearings 17. This handle 16 has a slot 18 spirally arranged through its surface so as to guide a pin 19, carried by a block 21, slidable in the stationary member 14. A slot 22 permits this pin 19 to move from right to left in the stationary member. This pin in turn impinges upon a cable 23, which passes downwardly through the tubular members 7 and 8, and has its opposite ends connected to steering knuckles 24 and 26. These steering knuckles are in turn connected to steering knuckles 27 and 28 respectively, and these steering knuckles are in turn tied together by a tie rod 29 so as to move simultaneously.

The result of this construction is that when the parts are in the position of Fig. 1, the wheels of the vehicle will cause the same to move forward in a straight line. If the operator of the vehicle rotates the handle 16 in one direction, the effect of the slot 18 will be to cause the pin 19 to move sidewise in its slot 22, thus exerting a pull upon the cable 23 in one direction and paying out the cable in the opposite direction, the effect of which will be to steer the wheels of the vehicle in any desired direction.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a steering handle for a vehicle having a pair of tubular supporting members attached to the chassis of the vehicle, a stationary element mounted between said tubular members, a slider positioned in said element, a pin carried by said slider and extending through a slot formed in said stationary element, a rotary handle surrounding said stationary element, a slot formed in said handle and engaging said pin, whereby rotation of said handle will cause a sidewise movement of said slider, and a flexible element connected to said slider and to the steering wheels of the vehicle.

2. In a device of the character described, in combination with a baby carriage having a pair of steerable wheels, a handle for said carriage, said handle comprising a rotatable tubular member, a stationary element positioned within said tubular member, a slider positioned in said stationary member, said slider being connected through flexible means to said steerable wheels, and interconnecting means between said tubular member and said slider for causing lateral movement of said slider when said tubular member is rotated.

3. In a device of the character described, in combination with a baby carriage having a pair of steerable wheels, a handle for said carriage, said handle comprising a rotatable tubular member, a stationary element positioned within said tubular member, a slider positioned in said stationary member, said slider being connected through flexible means to said steerable wheels, and interconnecting means between said tubular member and said slider for causing lateral movement of said slider when said tubular member is rotated, said means including a pin projecting from said slider and engaging a cam surface formed in said tubular member.

LOYD K. DAVIS.